United States Patent
Van Deest et al.

(10) Patent No.: US 11,065,815 B2
(45) Date of Patent: Jul. 20, 2021

(54) POWDER DISPENSING ASSEMBLY FOR AN ADDITIVE MANUFACTURING MACHINE

(71) Applicant: General Electric Company, Schenectady, NY (US)

(72) Inventors: Ryan William Van Deest, Liberty Township, OH (US); Eric Edward Halla, West Chester, OH (US)

(73) Assignee: General Electric Company, Schenectady, NY (US)

( * ) Notice: Subject to any disclaimer, the term of this patent is extended or adjusted under 35 U.S.C. 154(b) by 96 days.

(21) Appl. No.: 16/223,671

(22) Filed: Dec. 18, 2018

(65) Prior Publication Data

US 2020/0189191 A1  Jun. 18, 2020

(51) Int. Cl.
| | |
|---|---|
| B29C 64/329 | (2017.01) |
| B29C 64/255 | (2017.01) |
| B29C 64/259 | (2017.01) |
| B29C 64/153 | (2017.01) |
| B29C 64/209 | (2017.01) |
| B33Y 10/00 | (2015.01) |
| B33Y 30/00 | (2015.01) |
| B33Y 40/00 | (2020.01) |

(52) U.S. Cl.
CPC .......... *B29C 64/329* (2017.08); *B29C 64/153* (2017.08); *B29C 64/209* (2017.08); *B29C 64/255* (2017.08); *B33Y 10/00* (2014.12); *B33Y 30/00* (2014.12); *B33Y 40/00* (2014.12)

(58) Field of Classification Search
None
See application file for complete search history.

(56) References Cited

U.S. PATENT DOCUMENTS

| | | | |
|---|---|---|---|
| 5,647,931 A | * | 7/1997 | Retallick ................. B22F 3/004 156/273.3 |
| 6,902,246 B2 | | 6/2005 | Varnon et al. |
| 7,045,738 B1 | | 5/2006 | Kovacevic et al. |
| 7,572,403 B2 | | 8/2009 | Gu et al. |
| 8,020,726 B1 | | 9/2011 | Gorenz et al. |
| 9,855,704 B2 | | 1/2018 | Miyano et al. |
| 9,932,841 B2 | | 4/2018 | Staroselsky et al. |

(Continued)

FOREIGN PATENT DOCUMENTS

| | | |
|---|---|---|
| DE | 102018112380 A1 | 12/2018 |
| EP | 3135407 A1 | 3/2017 |

OTHER PUBLICATIONS

European Search Report Corresponding to Application No. 19207734 dated Jan. 23, 2020.

*Primary Examiner* — Jacob T Minskey
*Assistant Examiner* — Baileigh Kate Darnell
(74) *Attorney, Agent, or Firm* — Dority & Manning, P.A.

(57) ABSTRACT

A powder dispensing assembly for an additive manufacturing machine includes a hopper defining a powder reservoir for receiving additive powder and a plurality of powder distribution modules operably coupled with the hopper. The powder distribution modules include a powder distribution body defining a discharge orifice and a supply gate that fluidly couples the powder reservoir to the discharge orifice. A plunger valve is movably mounted over the discharge orifice and an actuator moves the plunger valve between an open position and a closed position to selectively dispense a flow of additive powder.

16 Claims, 11 Drawing Sheets

(56) References Cited

U.S. PATENT DOCUMENTS

| | | | |
|---|---|---|---|
| 10,328,525 B2 | 6/2019 | Gillespie et al. | |
| 2002/0105114 A1* | 8/2002 | Kubo | B29C 64/165 |
| | | | 264/497 |
| 2005/0015175 A1* | 1/2005 | Huang | B33Y 50/02 |
| | | | 700/121 |
| 2005/0280185 A1* | 12/2005 | Russell | B28B 7/465 |
| | | | 264/308 |
| 2011/0223349 A1 | 9/2011 | Scott | |
| 2011/0287185 A1* | 11/2011 | Felstead | B29C 64/241 |
| | | | 427/277 |
| 2014/0015172 A1 | 1/2014 | Sidhu et al. | |
| 2017/0021452 A1 | 1/2017 | Tanaka et al. | |
| 2017/0072636 A1 | 3/2017 | Ng et al. | |
| 2017/0203391 A1 | 7/2017 | Budge | |
| 2018/0134027 A1 | 5/2018 | O'Neill et al. | |
| 2018/0250749 A1 | 9/2018 | Redding et al. | |
| 2018/0345379 A1 | 12/2018 | Holford et al. | |

\* cited by examiner

POWDER DISPENSING ASSEMBLY FOR AN ADDITIVE MANUFACTURING MACHINE

FIELD

The present disclosure generally relates to additive manufacturing machines and processes, and more particularly to powder dispensing assemblies for additive manufacturing machines.

BACKGROUND

Additive manufacturing (AM) processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model.

A particular type of AM process uses an energy source such as an irradiation emission directing device that directs an energy beam, for example, an electron beam or a laser beam, to sinter or melt a powder material, creating a solid three-dimensional object in which particles of the powder material are bonded together. AM processes may use different material systems or additive powders, such as engineering plastics, thermoplastic elastomers, metals, and ceramics. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

During direct metal laser sintering (DMLS) or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

After fabrication of the part is complete, various post-processing procedures may be applied to the part. Post processing procedures include removal of excess powder by, for example, blowing or vacuuming. Other post processing procedures include a stress release process. Additionally, thermal and chemical post processing procedures can be used to finish the part.

Conventional AM machines include a powder hopper which may be moved over the powder bed to deposit a layer of additive powder to facilitate the printing process. In this regard, the hopper is typically a large volume with an elongated slot defined in one of the sidewalls of the hopper. A single gate is movably mounted over the elongated slot to regulate the flow of additive powder from the hopper. However, such conventional powder hoppers deposit a single layer of additive powder over an entire powder bed. As AM machines become larger for building larger parts, a very large volume of powder is needed to cover the entire powder bed, often resulting in wasted powder.

Accordingly, an AM machine with more versatile powder dispensing assemblies for selectively depositing additive powder would be useful. More particularly, a powder dispensing assembly that permits selectively depositing of additive powder at the desired locations and flow rates would be particularly beneficial.

BRIEF DESCRIPTION

Aspects and advantages will be set forth in part in the following description, or may be obvious from the description, or may be learned through practice of the invention.

According to one embodiment of the present subject matter, a powder dispensing assembly for an additive manufacturing machine is provided. The powder dispensing assembly includes a hopper defining a powder reservoir for receiving additive powder and a plurality of powder distribution modules operably coupled with the hopper. Each of the plurality of powder distribution modules includes a powder distribution body defining a discharge orifice and a supply gate that fluidly couples the powder reservoir to the discharge orifice, a valve operably coupled to the discharge orifice, and an actuator operably coupled to the valve to move the valve to dispense a flow of additive powder.

According to another exemplary embodiment, a powder distribution module for selectively dispensing additive powder from a powder reservoir is provided. The powder distribution module includes a powder distribution body defining a discharge orifice and a supply gate that fluidly couples the powder reservoir to the discharge orifice, a valve operably coupled to the discharge orifice, an actuator operably coupled to the valve to move the valve to dispense a flow of additive powder, and one or more coupling features for rigidly coupling the powder distribution body to an adjacent powder distribution body.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. In addition, the terms "upstream" and "downstream" refer to the relative direction with respect to the motion of an object. For example, "upstream" refers to the direction from which the object has moved, and "downstream" refers to the direction to which the object is moving. Furthermore, as used herein, terms of approximation, such as "approximately," "substantially," or "about," refer to being within a ten percent margin of error.

A powder dispensing assembly for an additive manufacturing machine is provided which includes a hopper defining a powder reservoir for receiving additive powder and a plurality of powder distribution modules operably coupled with the hopper. The powder distribution modules include a powder distribution body defining a discharge orifice and a supply gate that fluidly couples the powder reservoir to the discharge orifice. A plunger valve is movably mounted over the discharge orifice and an actuator moves the plunger valve between an open position and a closed position to selectively dispense a flow of additive powder.

Figure 1:
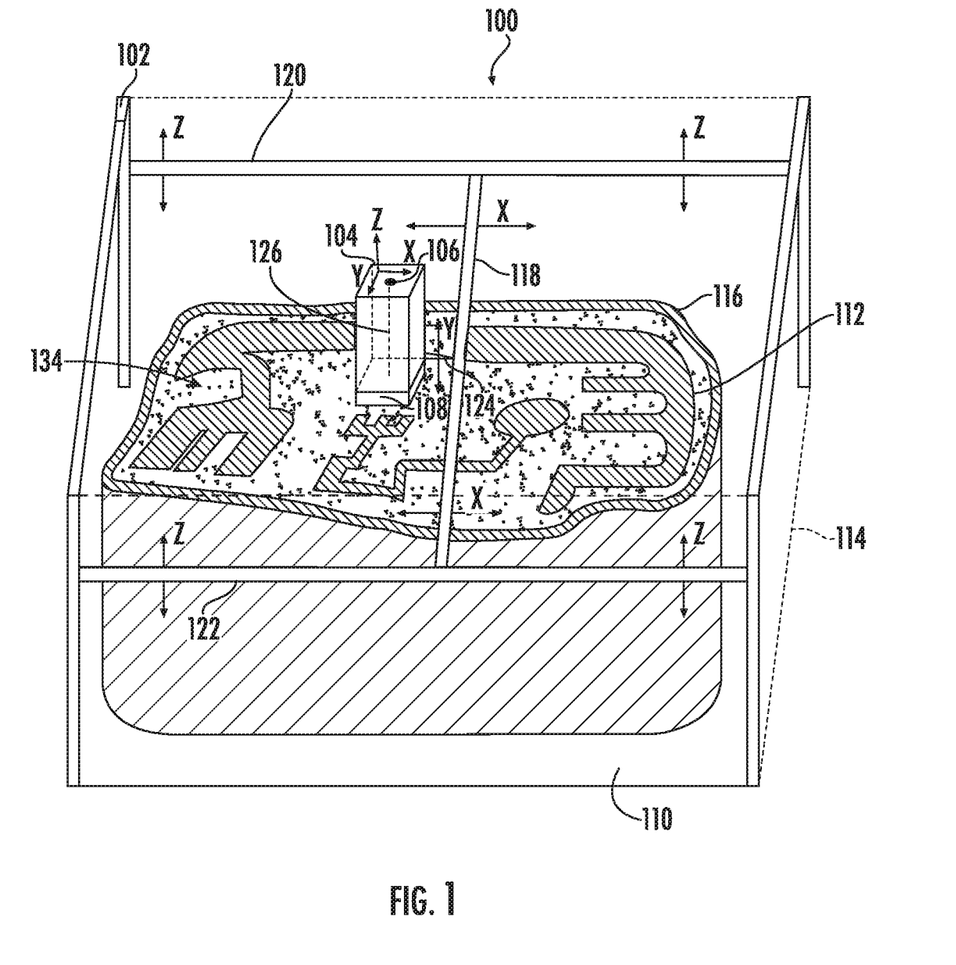
FIG. 1 shows a large scale additive manufacturing apparatus according to an embodiment of the invention.

FIG. 1 shows an example of one embodiment of a large-scale additive manufacturing machine 100 according to the present invention. The machine 100 comprises a positioning system 102, a build unit 104 comprising an irradiation emission directing device or energy source 106, a laminar gas flow zone 108, and a build platform 110 beneath an object being built, referred to herein as component 112. According to exemplary embodiments, a maximum build area 114 is defined by the positioning system 102, instead of by a powder bed as with conventional systems, and build area 114 for a particular build can be confined to a build envelope 116 that may be dynamically built up along with component 112.

As illustrated, positioning system 102 is a gantry having an X-crossbeam 118 that moves the build unit 104 in the X-direction. There are two Z-crossbeams 120 and 122 that move the build unit 104 and the X-crossbeam 118 in the Z-direction. The X-crossbeam 118 and the build unit 104 are attached by a mechanism 124 that moves the build unit 104 in the Y-direction. In this illustration of one embodiment of the invention, the positioning system 102 is a gantry, but the present invention is not limited to using a gantry. In general, the positioning system used in the present invention may be any multidimensional positioning system such as a delta robot, cable robot, robot arm, a belt drive, etc.

Notably, according aspects of the present subject matter, build unit 104 is supported by positioning system or gantry 102 that is positioned above a build platform 110 and at least partially defines build area 114. In addition, although build platform 110 is illustrated herein as being stationary, it should be appreciated that build platform 110 may move according to alternative embodiments. In this regard, for example build platform 110 may be configured for translating along the X-Y-Z directions or may rotate about one of these axes.

According to another exemplary embodiment, the irradiation emission directing device or energy source 106 may be independently moved inside of the build unit 104 by a second positioning system (not shown). As used herein, "energy source" may be used to refer to any device or system of devices configured for directing an energy beam towards a layer of additive powder to fuse a portion of that layer of additive powder. For example, according to an exemplary embodiment, energy source may be an irradiation emission directing device and many include a scanner having a lens for directing an energy beam, e.g., identified as beam 126 in FIG. 2.

There may also be an irradiation source that, in the case of a laser source, originates the photons comprising the laser beam irradiation is directed by the irradiation emission directing device. When the irradiation source is a laser source, then the irradiation emission directing device may be, for example, a galvo scanner, and the laser source may be located outside the build environment. Under these circumstances, the laser irradiation may be transported to the irradiation emission directing device by any suitable means, for example, a fiber-optic cable. According to an exemplary embodiment, irradiation emission directing device uses an optical control unit for directing the laser beam. An optical control unit may comprise, for example, optical lenses, deflectors, mirrors, and/or beam splitters. Advantageously, a telecentric lens may be used.

Figure 2:
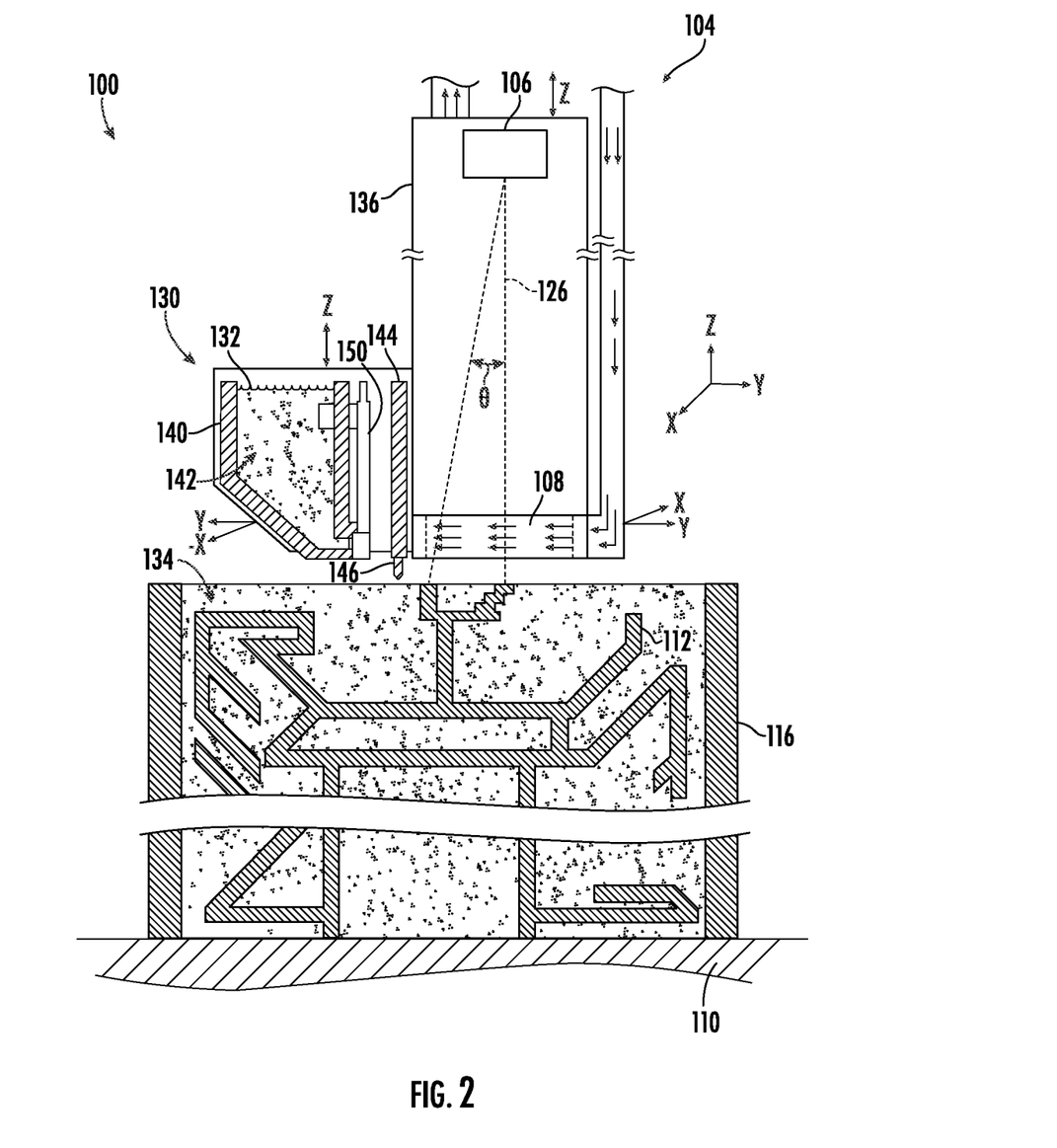
FIG. 2 shows a side view of a build unit according to an embodiment of the invention.

When a large-scale additive manufacturing apparatus according to an embodiment of the present invention is in operation, if the irradiation emission directing devices directs a laser beam, then generally it is advantageous to include a gasflow device providing substantially laminar gas flow to gasflow zone 108 as illustrated in FIGS. 1 and 2. In addition, the atmospheric environment outside build unit 104, i.e., the "build environment," or "containment zone," is typically controlled such that the oxygen content is reduced relative to typical ambient air, and so that the environment (e.g., build area 114) is at reduced pressure.

When the irradiation source is an electron source, then the electron source originates the electrons that comprise the e-beam that is directed by the irradiation emission directing device. An e-beam is a well-known source of irradiation. When the source is an electron source, then it is important to maintain sufficient vacuum in the space through which the e-beam passes. Therefore, for an e-beam, there is no gas flow across the gasflow zone (shown, for example at FIG. 1, 108). When the irradiation source is an electron source, then the irradiation emission directing device may be, for example, an electronic control unit which may comprise, for example, deflector coils, focusing coils, or similar elements.

According to exemplary embodiments, AM machine 100 allows for a maximum angle of the beam to be a relatively small angle θ to build a large part, because (as illustrated in FIG. 1) the build unit 104 can be moved to a new location to build a new part of component 112 being formed. When build unit 104 is stationary, the point on the powder that the energy beam touches when 0 is 0 defines the center of a circle in the X-Y plane (the direction of the beam when 0 is approximately 0 defines the Z-direction), and the most distant point from the center of the circle where the energy beam touches the powder defines a point on the outer perimeter of the circle. This circle defines the beam's scan area, which may be smaller than the smallest cross sectional area of the object being formed (in the same plane as the beam's scan area). There is no particular upper limit on the size of the object relative to the beam's scan area.

Referring now to FIG. 2, build unit 104 of AM machine 100 may further include a powder dispensing assembly 130 which is generally configured for selectively depositing additive powder 132 for facilitating the additive manufacturing process. In this regard, for example, powder dispensing assembly 130 may be configured for depositing a layer of additive material 132 onto build platform 110, or onto select locations of a powder bed 134 which is generally defined by build envelope 116. Powder dispensing assembly 130 will be described herein according to an exemplary embodiment. However, it should be appreciated that variations and modifications to powder dispensing assembly 130 may be implemented and powder dispensing assembly 130 may be used with other additive manufacturing machines according to alternative embodiments.

As shown, build unit 104 may include an enclosure 136 which generally houses energy source 106 and defines a controlled environment and/or a gas flow zone 108 to facilitate and improve the sintering or melting process. According to an exemplary embodiment, powder dispensing assembly 130 is attached to enclosure 136 such that enclosure 136 and powder dispensing assembly 130 may be supported and moved together as a single build unit 104 by positioning system or gantry 102, e.g., as described above. In this manner, as build unit 104 is moved across powder bed 134, powder dispensing assembly 130 may selectively deposit additive powder 132 at locations where component 112 will be formed and energy source 106 may selectively fuse the additive powder 132 to form component 112.

Figure 3:
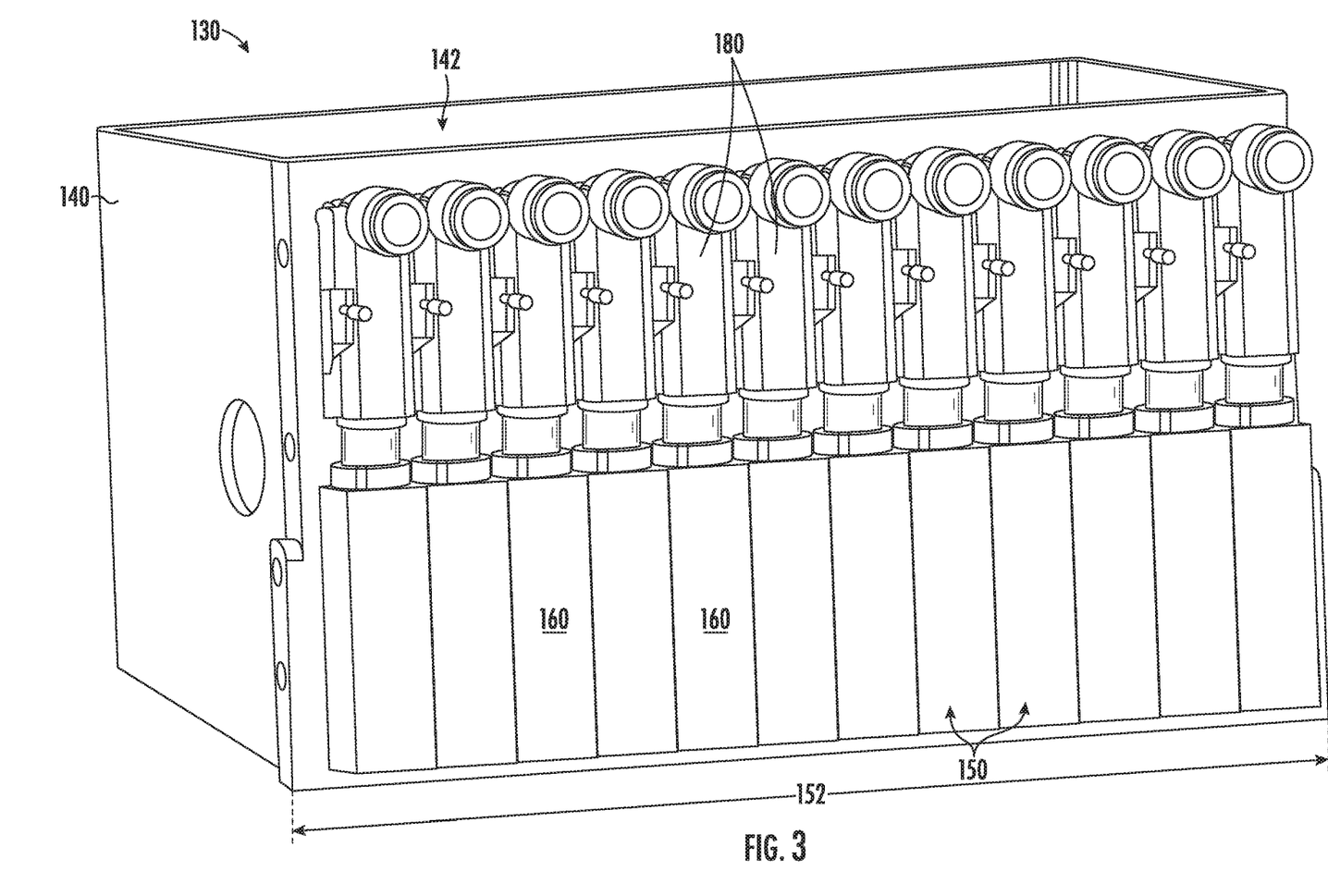
FIG. 3 shows a perspective view of a powder dispensing assembly of the exemplary build unit of FIG. 2 according to an embodiment of the invention.
Figure 4:
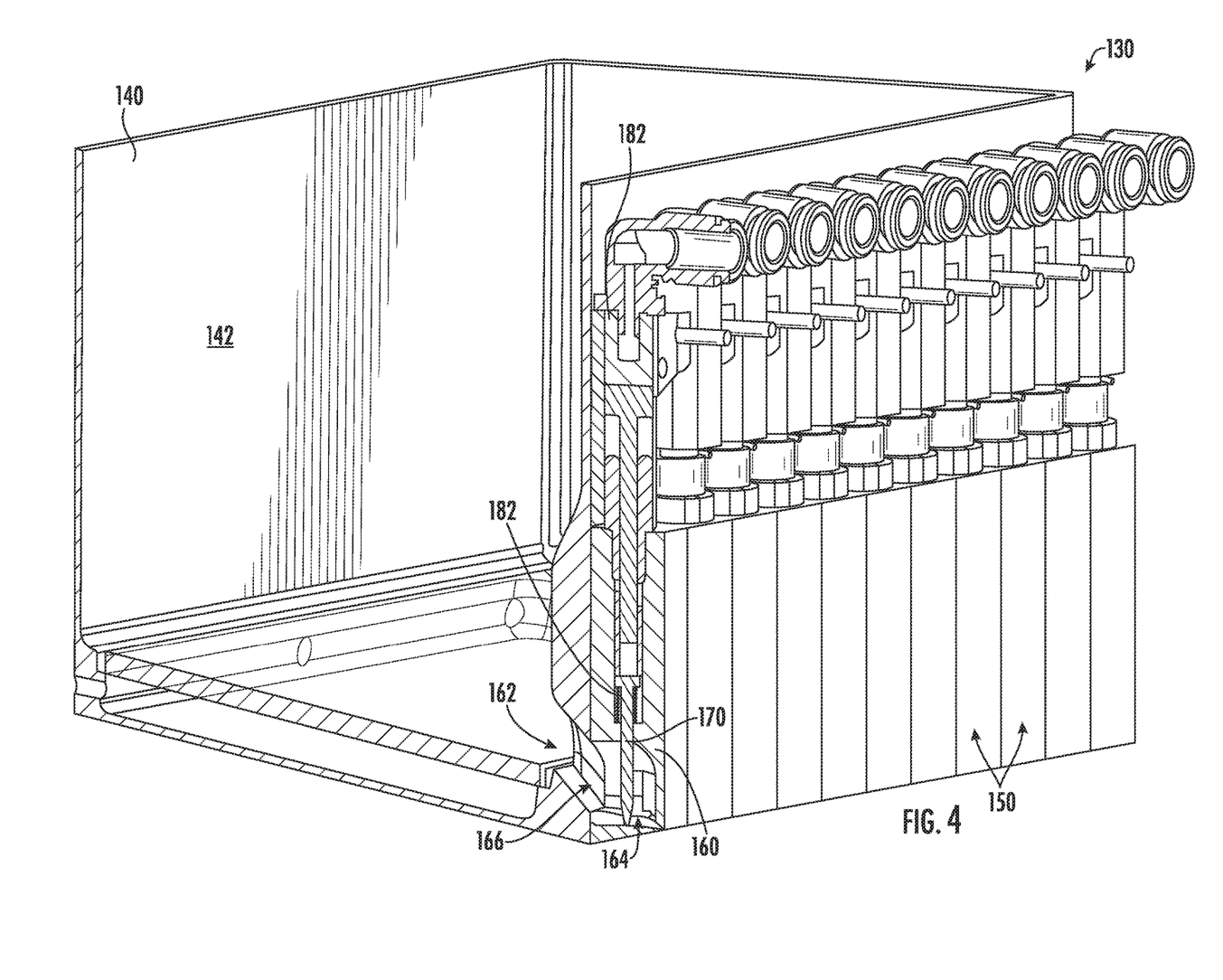
FIG. 4 shows a perspective, cross sectional view of the exemplary powder dispensing assembly of FIG. 3 according to an embodiment of the invention.
Figure 5:
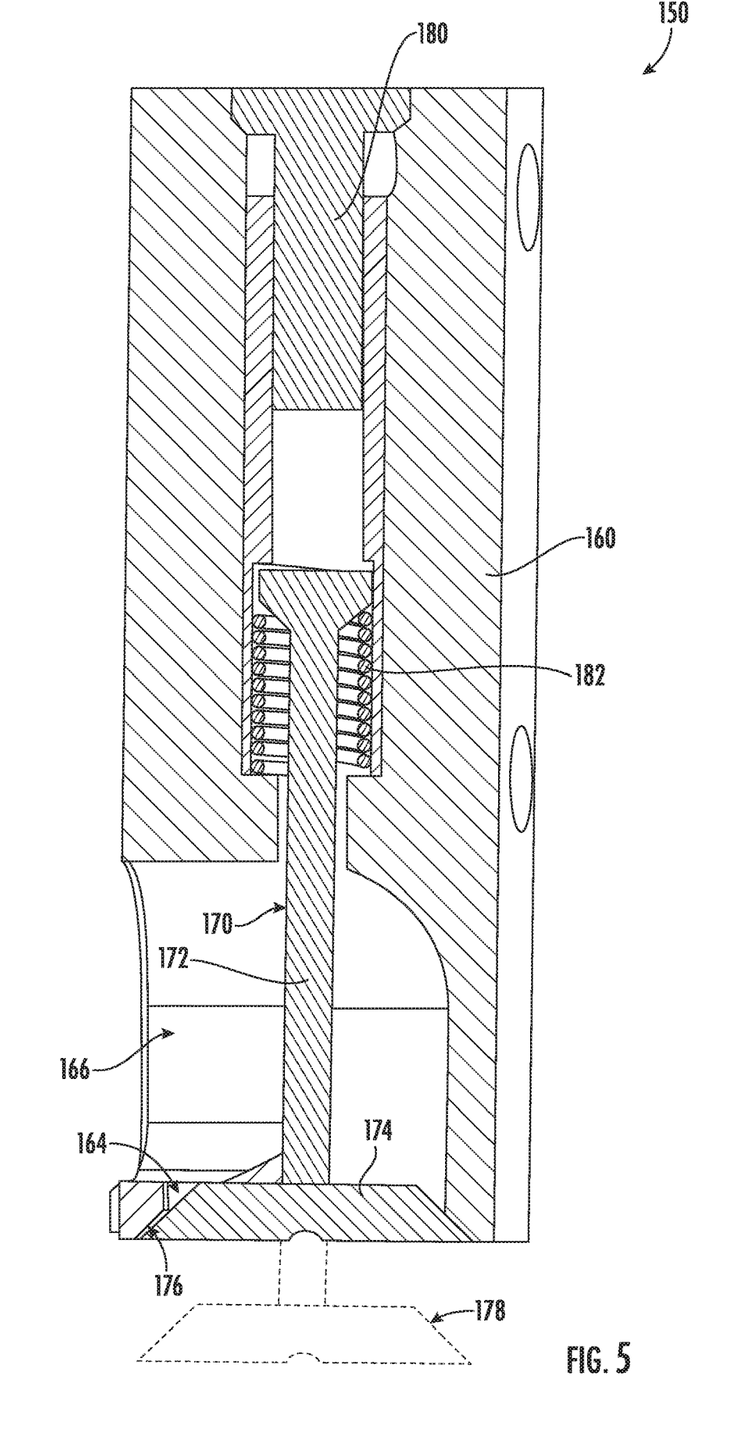
FIG. 5 provides a cross sectional view of a powder distribution module of the exemplary powder dispensing assembly of FIG. 3 according to an exemplary embodiment of the present subject matter.
Figure 6:
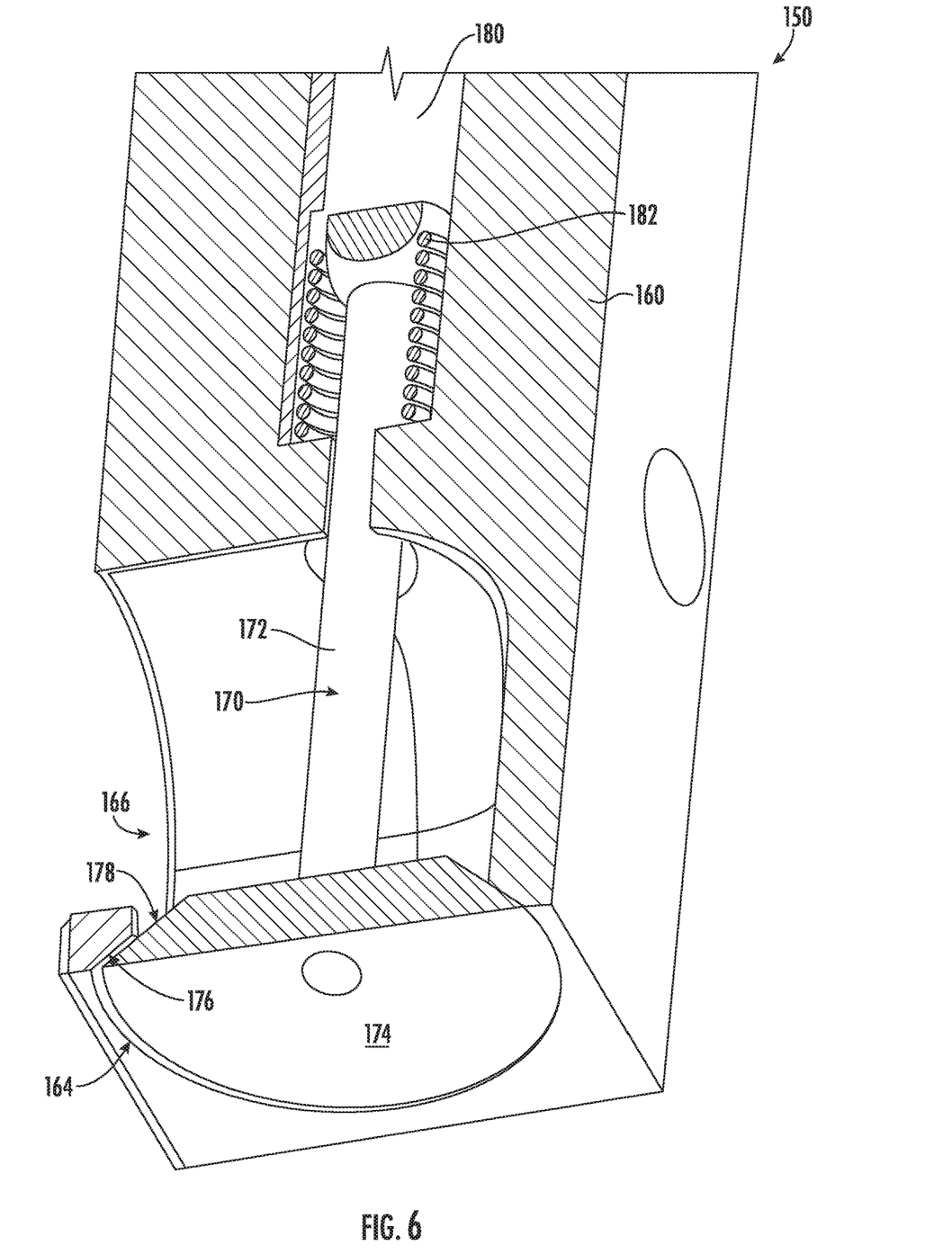
FIG. 6 provides a perspective, cross sectional view of the exemplary powder distribution module of FIG. 5.

Referring now also to FIGS. 3 and 4, powder dispensing assembly 130 may include a hopper 140 which includes a plurality of walls that generally define a powder reservoir 142 for receiving additive powder 132. In this regard, hopper 140 is generally sized for holding a sufficient volume of additive powder 132 to facilitate the uninterrupted printing of some or all of component 112. Intermittently throughout the printing process, build unit 104 may be moved by gantry 102 to a refill location where additional additive powder 132 may be supplied into powder reservoir 142. According to alternative embodiments, an additive powder supply system may be operably coupled with hopper 140 to continuously supply powder reservoir 142 with additive powder 132 throughout the printing process.

As best shown in FIG. 2, build unit 104 may further include a recoater arm 144 having a recoater blade 146 positioned at its bottom end for evening or smoothing out a layer of additive powder 132 as it is deposited onto powder bed 134 from powder reservoir 142. In this regard, recoater arm 144 may move along the vertical direction to provide the desired clearance between recoater blade 146 and powder bed 134. In this manner, recoater arm 144 and blade 146 may scrape or thin the layer of additive powder 132 to achieve the desired cross-sectional layer thickness. In general, build unit 104 may have a downstream end which faces the direction toward which build unit 104 is moving and an upstream end from which build unit 104 has moved. Specifically, referring to FIG. 2, build unit 104 moves from right to left such that additive powder 132 is deposited on bed 134 before enclosure 136 passes over the deposited powder to perform a sintering or melting process.

Referring now generally to FIGS. 3 through 9, powder dispensing assembly 130 may further include a plurality of powder distribution modules 150 which are operably coupled with hopper 140 for selectively dispensing additive powder 132, as described in detail below. In general, powder dispensing assembly 130 includes any suitable number of powder distribution modules 150 which may be stacked together and mounted to an upstream end of hopper 140 for regulating the flow of additive powder 132 selectively along a width 152 of hopper 140. For example, in certain circumstances it may be desirable to dispense more additive powder 132 at the edges of hopper 140 than from a center of hopper 140. The plurality of powder distribution modules 150 permits such selective dispensing along the width 152 of hopper 140. According still other embodiments, powder distribution modules 150 may be selectively opened to dispense additive powder 132 only within regions of powder bed 134 where component 112 will be fused or formed. Exemplary powder distribution modules 150 will be described below, though it should be appreciated that variations and modifications may be made while remaining within the scope of the present subject matter.

As illustrated, each powder distribution module 150 generally includes a powder distribution body 160 which may be mounted or otherwise positioned at an upstream end of hopper 140, e.g., over a hopper opening 162. In this regard, hopper opening 162 may be positioned proximate a bottom of hopper 140 for permitting additive powder 132 to flow out of powder reservoir 142. Powder distribution body 160 may define a discharge orifice 164 and a supply gate 166 that fluidly couples powder reservoir 142 to discharge orifice 164, e.g., via hopper opening 162. In this regard, supply gate 166 may be a passageway that extends between hopper opening 162 and discharge orifice 164 for directing additive powder while preventing clogs or promote even flow of additive powder 132. According to the illustrated embodiment, discharge orifice 164 is defined within a horizontal plane or faces downward along the vertical direction (e.g., the Z-direction) to permit additive powder 132 to fall or be deposited through discharge orifice 164 directly along the vertical direction under the force of gravity.

In addition, powder distribution module 150 further includes a plunger valve 170 which is movably mounted over discharge orifice 164 for regulating the flow of additive powder 132. In this regard, for example, plunger valve 170 includes a valve stem 172 that is slidably mounted within powder distribution body 160 for moving along the vertical direction to selectively position a valve head 174 within or over discharge orifice 164 to restrict or allow additive powder 132 to be deposited. Specifically, according to the illustrated embodiment, plunger valve 170 slides substantially along the vertical direction (e.g., Z-direction) and may be moved between an open position (e.g., as shown in dotted lines in FIG. 5) and a closed position (e.g., as shown in solid lines in FIG. 5). Furthermore, it should be appreciated that plunger valve 170 may be selectively positioned at any other suitable incremental position between the open and closed position to precisely regulate a flow rate of additive powder 132 from hopper 140.

According to the illustrated embodiment, discharge orifice 164 and valve head 174 have a substantially circular cross-sections for forming a fluid tight seal when plunger valve 170 is in the closed position. In addition, discharge orifice 164 may define an angled seat 176 and valve head 174 may define a complementary angled sealing face 178 for facilitating precise flow regulation of additive powder 132. However, it should be appreciated that according to alternative embodiments, plunger valve 170 and discharge orifice 164 may have any other suitable size, geometry, and/or configuration. For example, plunger valve 170 could instead operate as a flap valve or a ball valve, and discharge orifice 164 could instead have a rectangular or other suitable cross-sectional shape.

Figure 7:
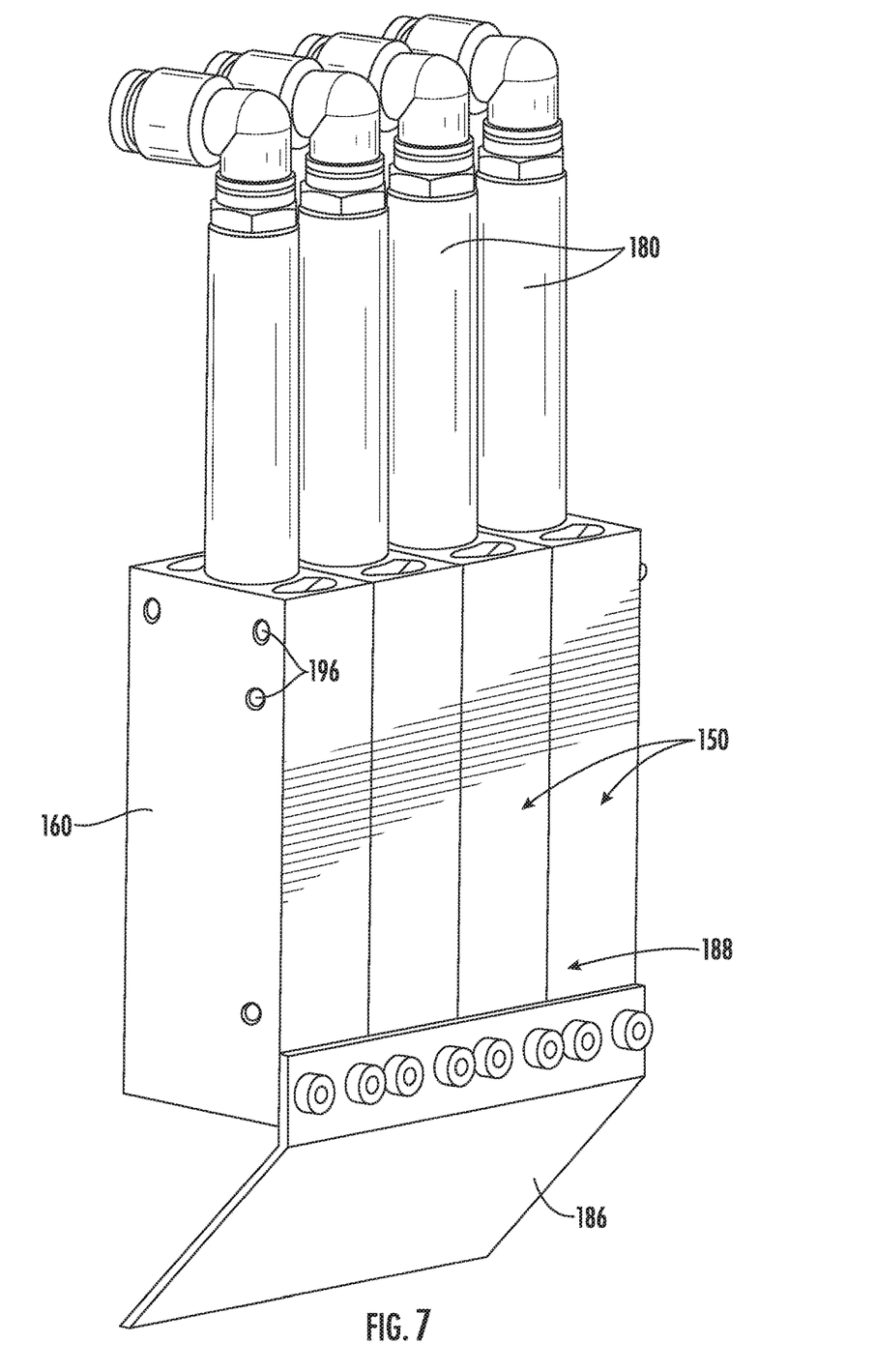
FIG. 7 provides a perspective view of the exemplary powder dispensing assembly of FIG. 3 with four powder distribution modules.
Figure 8:
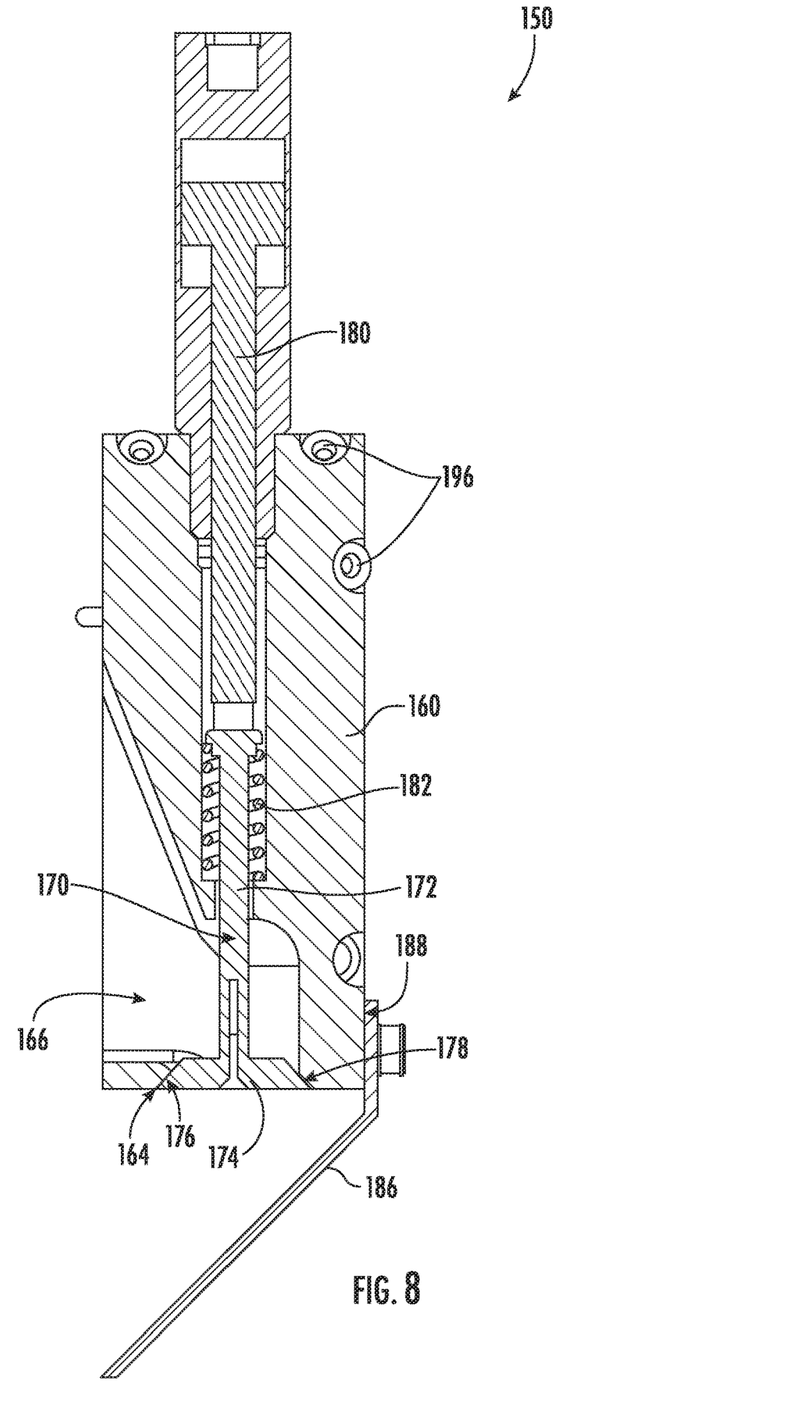
FIG. 8 provides a cross sectional view of the exemplary powder dispensing assembly of FIG. 7.
Figure 9:
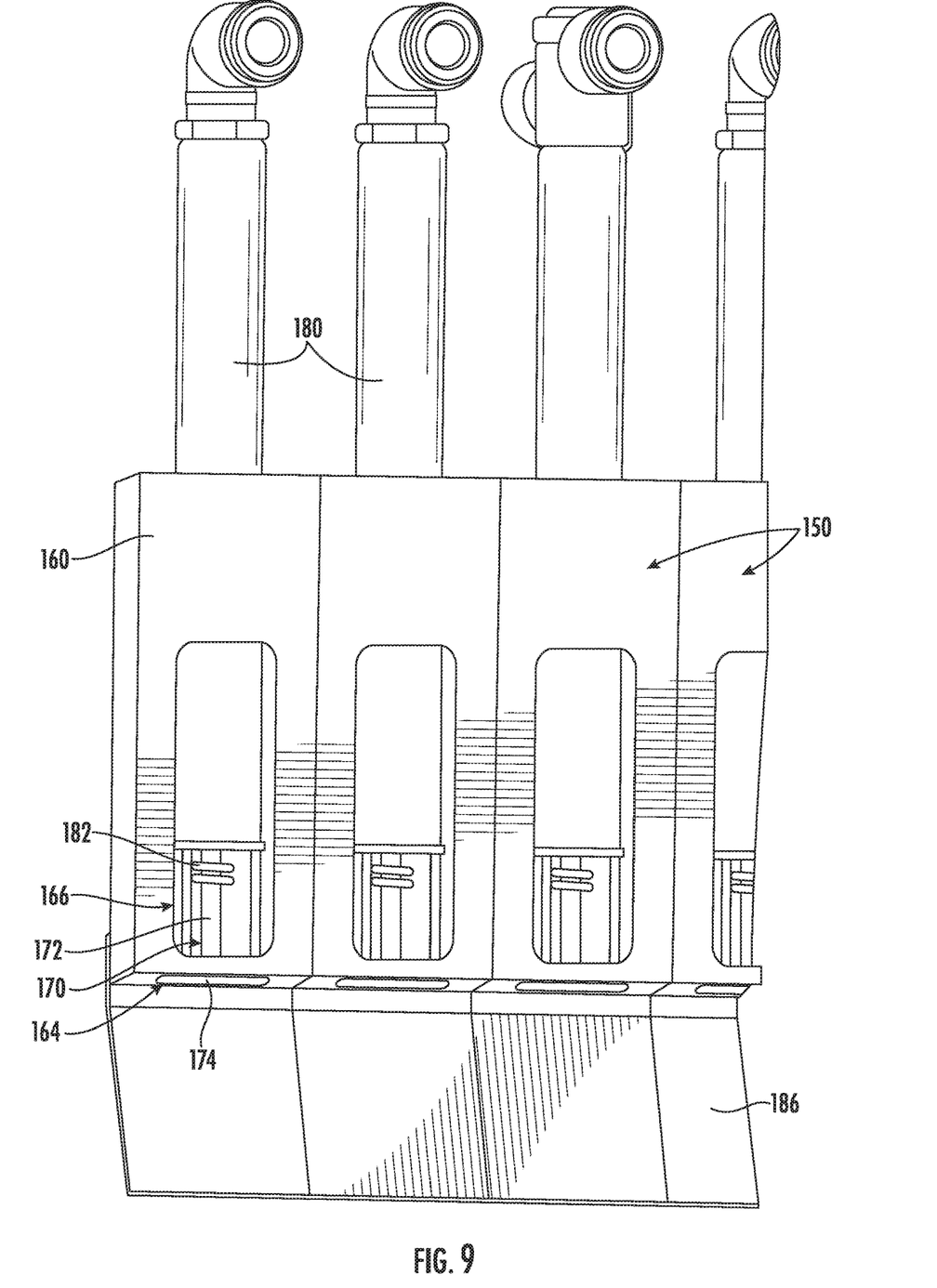
FIG. 9 provides a rear perspective view of the exemplary powder dispensing assembly of FIG. 7.

Powder distribution module 150 may further include an actuator 180 which is operably coupled to plunger valve 170 to move plunger valve 170 between the open and closed position for selectively dispensing or regulating a flow of additive powder 132. As used herein, "actuator" is intended to refer to any device or mechanism suitable for moving plunger valve 170 between an open or closed position or otherwise regulating the flow of additive powder 132 through discharge orifice 164. For example, as shown in FIGS. 7 through 9, actuator 180 is a pneumatic actuator which may be operated by regulating the flow of pressurized air from an air supply source (not shown). According to an alternative embodiment illustrated in FIGS. 10 and 11, actuator 180 is a piezoelectric actuator that permits precise positioning of plunger valve 170 in response to an electrical input. Other suitable actuators 180 are possible and within the scope of the present subject matter, such as linear actuators, hydraulic actuators, electric motor actuators, etc.

Referring again specifically to FIGS. 5 and 6, powder distribution module 150 may further include a spring mechanism 182 which is generally configured for urging plunger valve 170 towards a retracted or closed position. In this regard, spring mechanism 182 is illustrated as a mechanical spring which is compressed when plunger valve 170 is moved towards the open position, such that plunger valve 170 is always biased towards a closed position where the flow of additive powder 132 stops. It should be appreciated that according to other embodiments, alternative spring mechanisms 182 may be used to ensure the flow of additive powder 132 stops when actuator 180 is moved towards a disengaged or retracted position. In this manner, additive powder 132 is retained within powder reservoir 142 in the event of a power outage, compressed air failure, etc.

Referring now to FIGS. 7 through 9, powder dispensing assembly 130 may further include a diffuser plate 186 which is positioned below the discharge orifices 164 of some or all of the powder distribution modules 150 for directing the flow of additive powder 132 dispensed through the discharge orifices 164. In this regard, a single diffuser plate 186 is mounted to an upstream end 188 of each of the powder distribution modules 150 and is angled downstream (e.g., toward discharge orifice 164) for guiding and spreading dispensed additive powder 132 as it flows toward powder bed 134 under the force of gravity. As illustrated, a single diffuser plate 186 extends across the entire width of the plurality of powder distribution modules 150 (e.g. which corresponds to width 152 of hopper 140). However, it should be appreciated that according to alternative embodiments, each powder distribution module 150 may have a dedicated diffuser plate 186 which is mounted to upstream end 188 of powder distribution body 160. In addition, it should be appreciated that diffuser plate 186 may have any other suitable shape or profile, may be angled in any other suitable direction, or may include any other suitable features (e.g., ribs, fins, etc.) for facilitating the dispersion of additive powder 132 flowing along diffuser plate 186.

Figure 10:
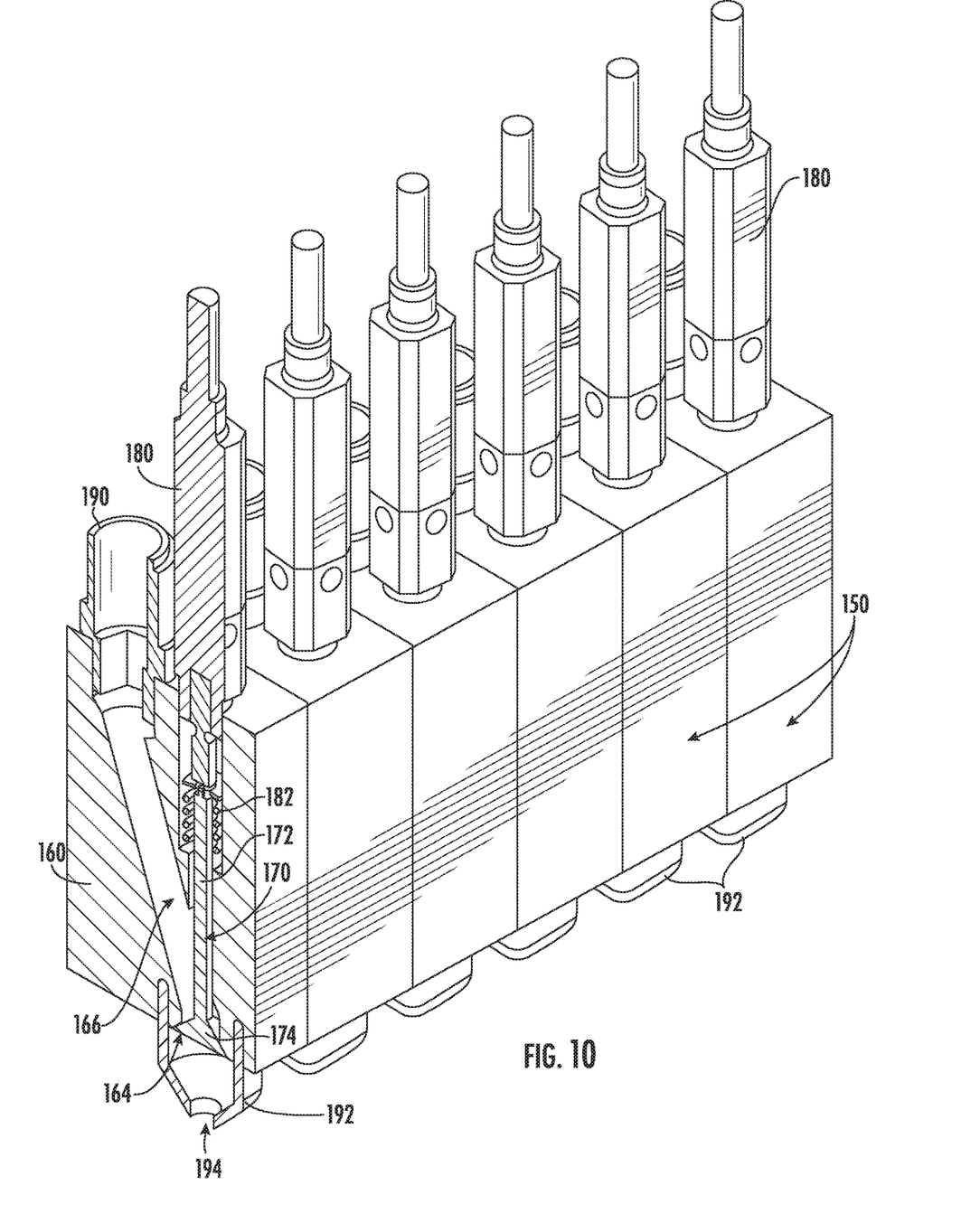
FIG. 10 shows a perspective cross sectional view of a powder dispensing assembly of the exemplary build unit of FIG. 2 according to another embodiment of the invention.
Figure 11:
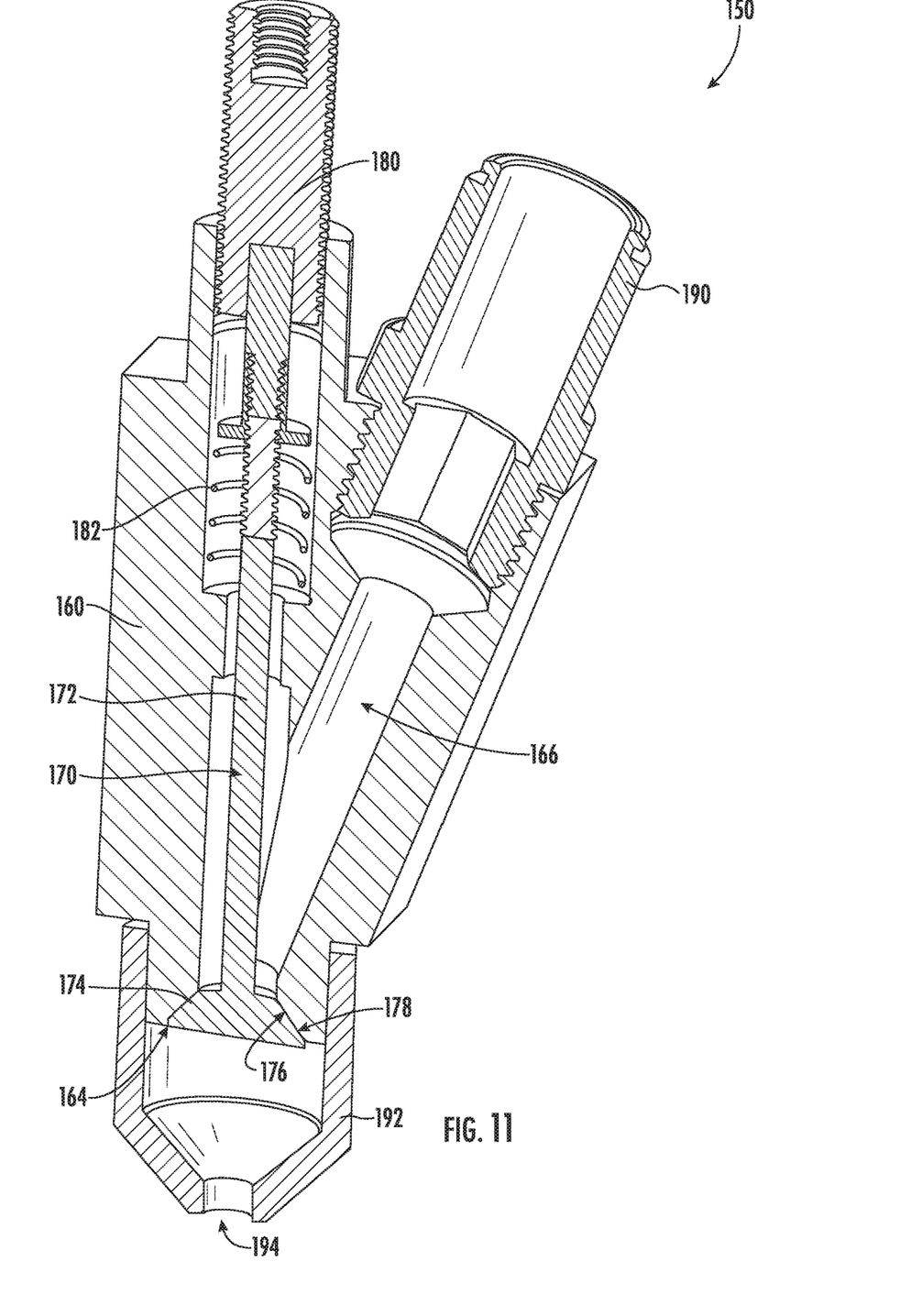
FIG. 11 provides a cross sectional view of a powder distribution module of the exemplary powder dispensing assembly of FIG. 10 according to an exemplary embodiment of the present subject matter.

Referring now specifically to FIGS. 10 and 11, an alternative powder distribution module will be described according to an exemplary embodiment. Notably, due to the similarity of powder distribution modules 150, like reference numerals will be used to refer to the same or similar components as described above. The primary difference between powder distribution module 150 illustrated in FIGS. 10 and 11 is the use of a piezoelectric actuator 180 and hopper 140 is coupled to powder distribution module 150 through a powder supply fitting 190. Moreover, powder distribution module 150 includes a discharge nozzle 192 that is positioned below the discharge orifice 164 for directing the flow of additive powder 132 that is dispensed through discharge orifice 164. In this regard, discharge nozzle 192 is attached to powder distribution body 160 and may be angled toward a circular outlet 194. According still other embodiments, outlet 194 may have any other suitable shape, such as a flat or elongated slot for spreading the flow of additive powder 132.

Notably, as described above, powder dispensing assembly 130 includes a plurality of powder distribution modules 150 that are stacked adjacent each other along width 152 of hopper 140. For example, as shown in FIG. 3, powder dispensing assembly 130 includes 12 powder distribution modules 150 that are joined together and coupled to hopper 140. According to exemplary embodiments, to ensure rigid attachment between adjacent powder distribution modules 150, each powder distribution module 150 may define one or more coupling features 196 for rigidly coupling adjacent powder distribution modules 150. For example, as illustrated in FIGS. 7 and 8, coupling features 196 may include one or more bosses defined through powder distribution bodies 160 for receiving mechanical fasteners (not shown). It should be appreciated that other means for joining powder distribution modules 150 are possible and within the scope of the present subject matter. Notably, the use of a plurality of powder distribution modules 150 permits improved serviceability and replacement of faulty modules without unnecessary or excessive machine downtime.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A powder dispensing assembly for an additive manufacturing machine, the powder dispensing assembly comprising:
    a hopper defining a powder reservoir for receiving additive powder; and
    a plurality of powder distribution modules removably mounted to the hopper, each of the plurality of powder distribution modules comprising:
        a powder distribution body defining a discharge orifice and a supply gate that fluidly couples the powder reservoir to the discharge orifice;
        a valve operably coupled to the discharge orifice; and
        an actuator operably coupled to the valve to move the valve to dispense a flow of additive powder.

2. The powder dispensing assembly of claim 1, wherein the valve comprises a spring configured for urging the valve to a closed position.

3. The powder dispensing assembly of claim 1, wherein the valve is incrementally adjustable between an open position and a closed position to dispense the flow of additive powder.

4. The powder dispensing assembly of claim 1, wherein the actuator is selected from a group consisting of a pneumatic actuator, a piezoelectric actuator, and a linear actuator.

5. The powder dispensing assembly of claim 1, wherein the valve comprises a plunger valve comprising a valve stem slidably positioned within the powder distribution body and a valve head attached to the valve stem.

6. The powder dispensing assembly of claim 5, wherein the discharge orifice is substantially circular and defines an angled seat and the valve head defines an angled sealing face.

7. The powder dispensing assembly of claim 5, wherein the discharge orifice and the valve head are non-circular.

8. The powder dispensing assembly of claim 5, wherein the discharge orifice faces down along a vertical direction, and wherein the plunger valve slides substantially along the vertical direction.

9. The powder dispensing assembly of claim 1, wherein each of the plurality of powder distribution modules further comprises:
    a discharge nozzle positioned below the discharge orifice for directing the flow of additive powder dispensed from the discharge orifice.

10. The powder dispensing assembly of claim 1, further comprising:
    a diffuser plate positioned below the discharge orifice for spreading the flow of additive powder dispensed from the discharge orifice.

11. The powder dispensing assembly of claim 10, wherein the diffuser plate is mounted to an upstream end of the powder distribution body and is angled downstream.

12. The powder dispensing assembly of claim 1, wherein the diffuser plate extends across an entire width of the plurality of powder distribution modules.

13. The powder dispensing assembly of claim 1, wherein each of the plurality of powder distribution modules defines one or more coupling features for coupling the powder distribution module to adjacent powder distribution modules.

14. The powder dispensing assembly of claim 1, wherein the powder dispensing assembly is movably supported from a gantry within a build area of the additive manufacturing machine.

15. A powder dispensing assembly for an additive manufacturing machine, the powder dispensing assembly comprising:
    a hopper defining a powder reservoir for receiving additive powder, wherein the hopper comprises a downstream sidewall defining a hopper opening; and
    a plurality of powder distribution modules operably coupled with the hopper, each of the plurality of powder distribution modules comprising:
        a powder distribution body mounted to the downstream sidewall, the powder distribution body defining a discharge orifice and a supply gate that fluidly couples the hopper opening of the powder reservoir to the discharge orifice;
        a valve operably coupled to the discharge orifice; and
        an actuator operably coupled to the valve to move the valve to dispense a flow of additive powder.

16. The powder dispensing assembly of claim 15, further comprising:
    a recoater blade positioned downstream from the powder distribution module such that each of the plurality of powder distribution modules are positioned between the hopper and recoater blade.

* * * * *